United States Patent
McDonald et al.

(10) Patent No.: US 6,523,539 B2
(45) Date of Patent: Feb. 25, 2003

(54) SELF-ELONGATING OXYGEN HOSE FOR STOWABLE AVIATION CREW OXYGEN MASK

(75) Inventors: Thomas K. McDonald, Overland Park, KS (US); Gary R. Hannah, Shawnee, KS (US)

(73) Assignee: BE Intellectual Property Inc., Wellington, FL (US)

( * ) Notice: Subject to any disclaimer, the term of this patent is extended or adjusted under 35 U.S.C. 154(b) by 0 days.

(21) Appl. No.: 09/896,750

(22) Filed: Jul. 2, 2001

(65) Prior Publication Data

US 2003/0000530 A1 Jan. 2, 2003

(51) Int. Cl.[7] .............................................. A62B 18/02
(52) U.S. Cl. ................. 128/205.25; 128/206.2
(58) Field of Search ....................... 128/205.25, 206.21; 137/225

(56) References Cited

U.S. PATENT DOCUMENTS

| | | | |
|---|---|---|---|
| RE29,613 E | * | 4/1978 | Kropfhammer |
| 4,915,106 A | | 4/1990 | Aulger et al. |
| 5,664,566 A | | 9/1997 | McDonald et al. |
| 5,947,116 A | * | 9/1999 | Gamow et al. ........ 128/201.11 |
| 5,954,052 A | | 9/1999 | McDonald et al. |
| 6,408,848 B1 | * | 6/2002 | Feldman et al. ....... 128/200.22 |

FOREIGN PATENT DOCUMENTS

WO      9002582      3/1990

* cited by examiner

Primary Examiner—Henry Bennett
Assistant Examiner—Alfred Basichas
(74) Attorney, Agent, or Firm—Hovey Williams LLP

(57) ABSTRACT

A supplemental gas assembly (10) such as used for aircraft crews is provided which includes a mask (12) adapted to fit over at least the nose and mouth of a wearer, together with a flexible, self-elongating hose assembly (14) and a stowage box (16) for receiving the mask (12) and hose assembly (14); the assembly (14) is designed so that when the mask (12) is pulled from the box (16), pressurized gas passing through the hose assembly (14) serves to inflate and axially expand the assembly (14) to a deployed length greater than the relaxed length thereof. The assembly (14) preferably includes an inflatable elastomeric inner tube (30) together with an exterior sheath (36) of woven or braided material which restricts radial expansion of the tube (30) while permitting axial expansion thereof. In preferred forms, the deployed length of the assembly (14) is up to three times greater than the relaxed length thereof.

11 Claims, 2 Drawing Sheets

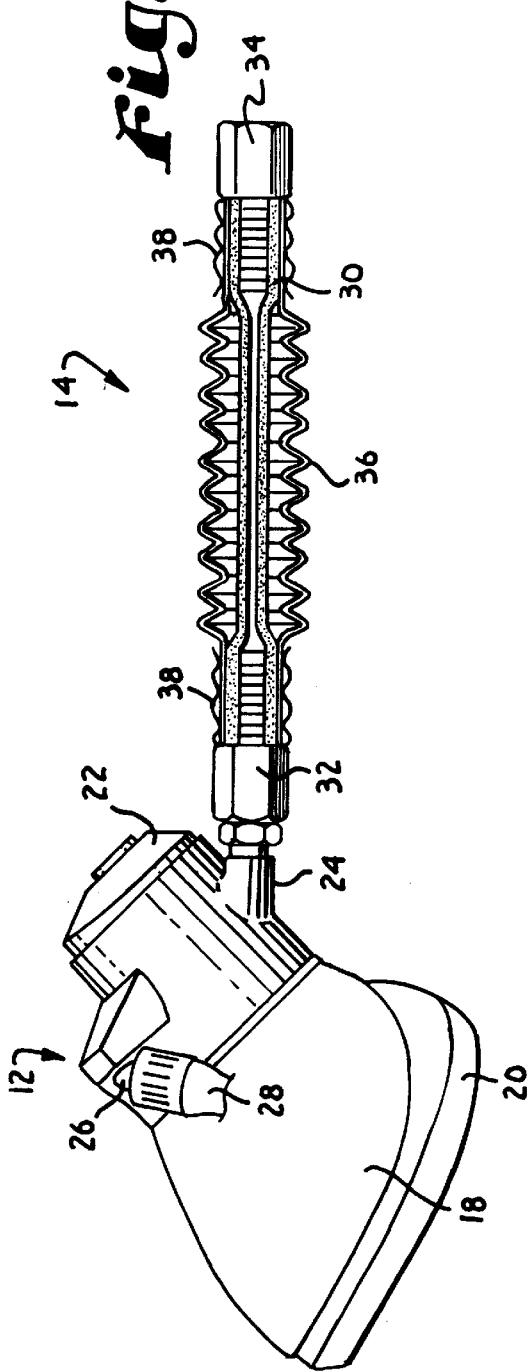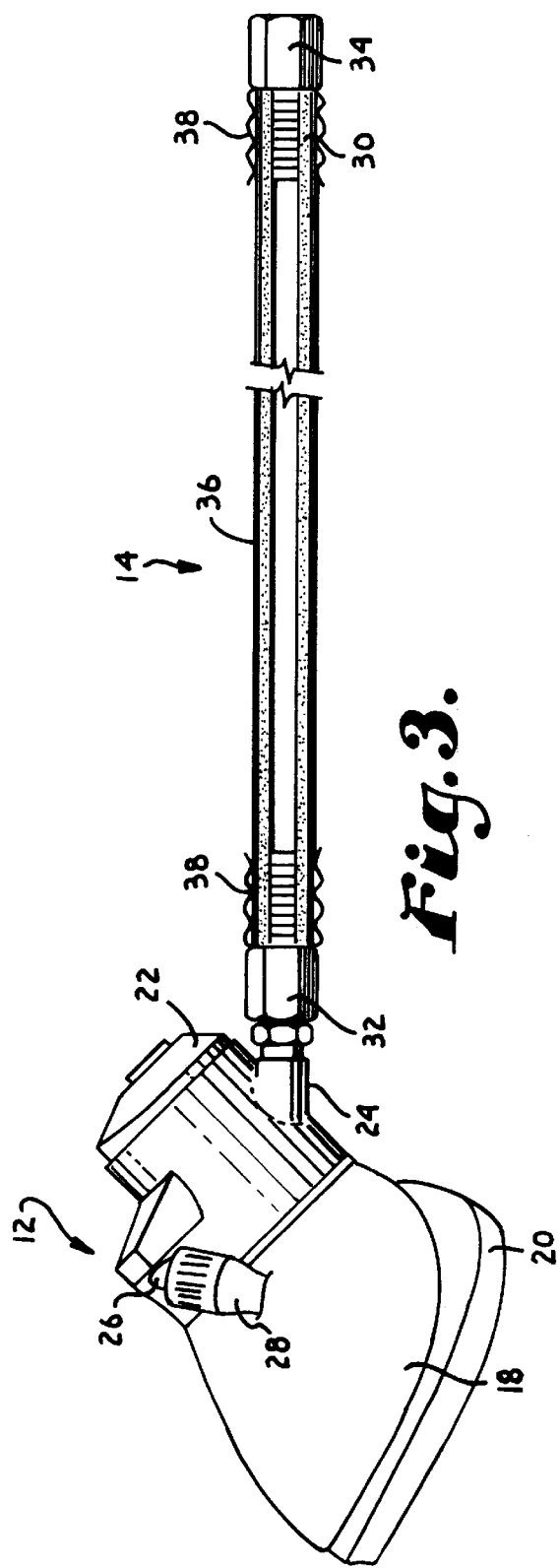

SELF-ELONGATING OXYGEN HOSE FOR STOWABLE AVIATION CREW OXYGEN MASK

BACKGROUND OF THE INVENTION

1. Field of the Invention

The present invention is broadly concerned with supplemental gas assemblies such as supplemental oxygen units typically used in aircraft for supplying supplemental oxygen to aircraft crew in the event of a cabin depressurization or other emergency. More particularly, the invention is concerned with such assemblies wherein a self-elongating gas hose assembly is employed which, when pressurized, axially expands to a significant extent. This gives the user a relatively long effective hose length, while avoiding the problems of handling and stowage typical with conventional hoses.

2. Description of the Prior Art

During the course of aircraft operation, pilots, navigation officers and other crew personnel, may need supplemental gas (e.g., oxygen) to provide protection from smoke from onboard fires and other possible airborne eye and lung irritants which may enter the crew compartment. There is a requirement in the commercial aviation industry that crew masks be capable of donning in five seconds or less. The provision of crew mask assemblies is sensitive to both the quick-donning requirements and the very limited space and volume available in aircraft flight decks.

The donning issue has been responded to by provision of crew oxygen masks having inflatable harnesses. In such designs (see U.S. Pat. Nos. 4,915,106 and 5,664,566), the harness straps expand upon introduction of pressurized gas to assume an enlarged configuration permitting easy donning. When vented, however, these harness assemblies contract and engage the wearer's head to firmly hold the mask in place.

In recent years, available flight deck space has become even more precious, leading to efforts to reduce the volume of components. However, very little reduction in mask stowage box volume has been achieved, owing to the fact that the oxygen delivery hoses coupled with the mask must be of a certain minimum length to allow and facilitate crew use. That is, these stowage boxes, because they must receive a relatively long length of hose, cannot be readily reduced in size.

There is accordingly a need in the art for improved supplemental gas assemblies which can be made in a more compact design, while still achieving the degree of utility and rapid donning characteristics required for crew oxygen equipment.

SUMMARY OF THE INVENTION

The present invention overcomes the problems outlined above and provides supplemental gas (e.g., oxygen) assemblies including a mask adapted to fit over at least the nose and mouth of a wearer, with a flexible hose coupled with the mask and a source of supplemental gas; at least a portion of the mask and the hose are received within a stowage box. In accordance with the invention, the hose assembly comprises a length-expandable hose which, when a user grasps the mask and pulls it from the stowage box, will inflate and axially expand to a deployed length greater than the relaxed length thereof. In this way, the stowage requirements for the hose assembly are reduced, or alternately a hose having a substantially longer effective length can be used in a standard stowage box designed to accommodate a much smaller length conventional hose assembly.

In preferred forms, the hose assembly includes an inflatable elastomeric inner tube together with an exterior sheath formed of woven or braided material which in use restricts the radial expansion of the inner tube upon pressurization thereof, while allowing the tube to expand axially. The hose assemblies may have a deployed length of at least about 1.5 times the relaxed length thereof, and more preferably greater than about two times the relaxed length.

BRIEF DESCRIPTION OF THE DRAWINGS

FIG. 2 is a side view in partial vertical section illustrating the construction of a supplemental gas mask assembly in accordance with the invention, with the gas hose in its relaxed condition; and FIG. 3 is a view similar to that of FIG. 2, but depicting the mask assembly in its elongated condition.

DETAILED DESCRIPTION OF THE PREFERRED EMBODIMENT

Figure 1:
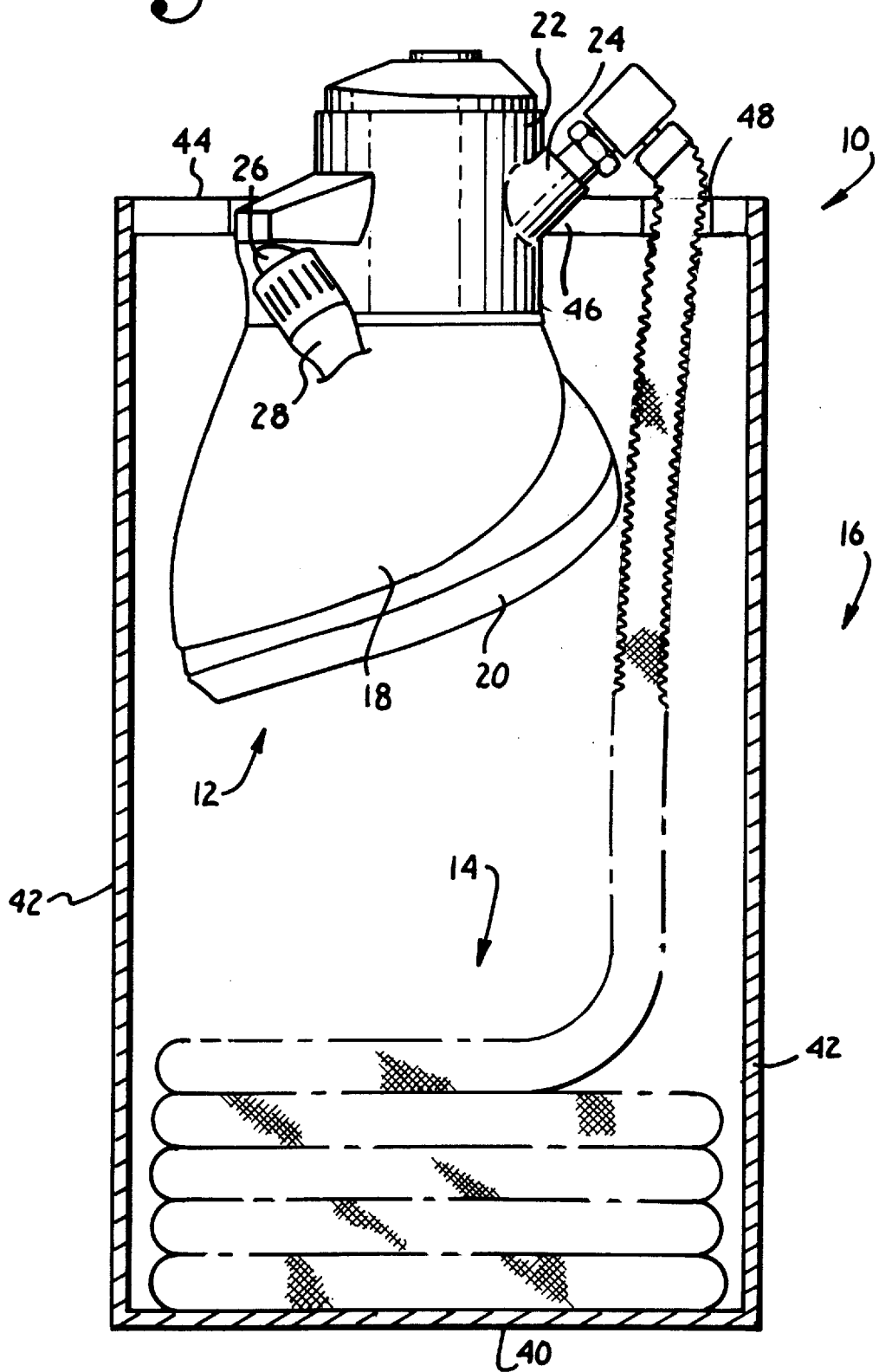
FIG. 1 is a vertical sectional view illustrating a supplemental gas assembly of the type used in aircraft, and including the self-elongating hose construction of the invention.

Turning now to the drawings, and particularly FIG. 1, a supplemental gas assembly 10 broadly includes a mask 12 adapted to fit over the nose and mouth of a wearer, together with an elongated, length-expandable hose assembly 14 coupled with the mask 12. As illustrated, the mask and hose are housed within a stowage box 16 of the type used for emergency crew oxygen equipment in aircraft. In use, the mask 12 may be grasped adjacent the upper end thereof and pulled from the box 16 so that the mask may be donned by a user.

In more detail, the mask 12 is of conventional design and includes a hollow flexible section 18 having a soft, pliable, surrounding face seal 20. As shown in FIG. 1, the upper end of the mask 12 includes a regulator 22 and appropriate couplers 24 and 26 for the hose assembly 14 and harness straps 28, the latter permitting donning of the mask. The straps 28 may optionally be of the inflatable variety as described in U.S. Pat. Nos. 4,915,106 and 5,664,566, incorporated by reference herein. Although a nose and mouth mask 12 is depicted, it will be appreciated that full-face masks can also be used in the context of the invention.

The hose assembly 14 is best illustrated in FIGS. 2 and 3 and is designed so that the end thereof remote from mask 12 may be coupled with a conventional connector within box 16. The assembly 14 includes an inner, resilient, expandable tube 30 secured to endmost threaded hose fittings 32 and 34, together with an outer sheath 36 formed of woven or braided material. The sheath 36 is secured to the ends of the hose assembly by means of crimp ferrules 38. Thus, the fitting 32 is secured to coupler 24 of mask 12, whereas the opposite fitting 34 is threaded onto the box-mounted gas fitting (not shown).

In more detail, the tube 30 may be formed of an elastomeric material, and particularly those selected from the group consisting of silicone rubber materials. The sheath on the other hand is preferably formed of "NOMEX (a synthetic resin fiber material commercialized by DuPont)" flexible fabric; the sheath could also be formed of other suitable materials such as KEVLAR (a synthetic resin fiber material commercialized by DuPont), NYLON (polyamide fiber), or monofilament. The sheath 36 has a length which is two to three times the length of the inner tube 30. As best seen in FIG. 2, in the relaxed condition of the assembly 14, the sheath 36 is in a gathered or shirred condition along the length of the unexpanded tube. However, as depicted in FIG. 3, when a pressurized gas such as oxygen is delivered into the tube 30, it expands in both radial and axial directions. However, the presence of the sheath 36 serves to inhibit and restrict the extent of radial expansion of the tube 30, but permits axial elongation thereof. Preferably, the deployed length of the hose assembly 14 is at least about 1.5 times the relaxed length thereof, and more preferably at least about two times the relaxed length.

The box 16 is itself entirely conventional, and includes bottom wall 40 upstanding sidewalls 42 and a hinged top cover 44. The latter has an opening 46 formed therein which is designed to receive mask 12 with the regulator end thereof protruding above the top cover.

The use of assembly 10 is similar to that of standard crew oxygen emergency equipment. That is, in the event of a cabin depressurization, the pilot may grasp the upper end of mask 12 and pull it upwardly. This causes the hinge cover 44 to open and facilitates easy removal of the mask. The pilot then pulls the mask to his or her face with seal 20 surrounding the nose and mouth area of the pilot's face, so that the mask may be quickly donned. In this connection, many such masks are equipped with gas-expandable harness assemblies which inflate and allow quick mask donning; thereafter, the harness assembly is fully or partially deflated, causing the mask straps to engage the pilot's head.

In the present instance, however, during mask deployment the hose assembly 14 comes into play in order to self-elongate from a relaxed condition (e.g., FIG. 2) to a fully extended position (e.g., FIG. 3). This effectively gives the pilot an additional length of hose to facilitate donning of the mask. At the same time, the hose in its relaxed condition allows easy stowage of the mask assembly, both originally and after use of the mask. Furthermore, given that the hose is secured to a connector within the box 16, after use the hose will "retract" itself and the oxygen mask back into the box 16. This aids significantly in restowage, since the hose does not require the extent of gathering and coiling typical of conventional hose assemblies.

We claim:

1. In a supplemental gas assembly including a mask adapted to fit over at least the nose and mouth of a wearer, a flexible hose operably coupled with said mask and source of supplemental gas and having a relaxed length, and a stowage box adapted to receive at least a portion of said mask and hose when the latter are not in use by said wearer, the improvement which comprises using as said hose a length-expandable hose which, when said wearer grasps said mask and pulls the mask from said box, will inflate and axially expand to a deployed length greater than said relaxed length, said length-expandable hose comprising an inflatable inner tube and an exterior sheath which restricts the radial expansion of said inner tube while allowing said axial expansion during said hose inflation.

2. The assembly of claim 1, said inner tube formed of an elastomeric material, said sheath being a woven or braided material.

3. The assembly of claim 2, said inner tube formed of an elastomeric material.

4. The assembly of claim 1, said deployed length being at least about 1.5 times said relaxed length.

5. The assembly of claim 4, said deployed length being greater than about 2 times said relaxed length.

6. A supplemental gas mask assembly comprising:

a mask body adapted to fit over at least the nose and mouth of a wearer;

an elongated hose operably coupled with said mask for supplying supplemental gas to the mask body, and having a relaxed length.

said hose being a length-expandable hose which, when supplemental gas under pressure is directed through the hose, will inflate and expand in an axial direction to a deployed length greater than said relaxed length, said length-expandable hose comprising an inflatable inner tube and an exterior sheath which restricts the radial expansion of said inner tube while allowing said axial expansion during said hose inflation.

7. The assembly of claim 6, said inner tube formed of an elastomeric material, said sheath being a woven or braided material.

8. The assembly of claim 7, said inner tube formed of a material selected from the group consisting of silicone and nitrile materials.

9. The assembly of claim 6, said deployed length being at least about 1.5 times said relaxed length.

10. The assembly of claim 9, said deployed length being greater than about 2 times said relaxed length.

11. The assembly of claim 6, the end of said hose opposite said mask body adapted for connection to a supplemental gas source.

* * * * *